(12) United States Patent
Abdulkader et al.

(10) Patent No.: US 7,593,908 B2
(45) Date of Patent: Sep. 22, 2009

(54) TRAINING WITH HETEROGENEOUS DATA

(75) Inventors: Ahmad A. Abdulkader, Woodinville, WA (US); Iaonnis A. Drakopoulos, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/167,734

(22) Filed: Jun. 27, 2005

(65) Prior Publication Data

US 2007/0011117 A1    Jan. 11, 2007

(51) Int. Cl.
G06N 3/08    (2006.01)
(52) U.S. Cl. ......................... 706/25; 382/187
(58) Field of Classification Search .................. 706/25; 382/187
See application file for complete search history.

(56) References Cited

U.S. PATENT DOCUMENTS

| | | | |
|---|---|---|---|
| 5,680,480 | A | 10/1997 | Beernink et al. |
| 5,710,832 | A | 1/1998 | Berman et al. |
| 5,838,816 | A | 11/1998 | Holmberg |
| 6,044,344 | A | 3/2000 | Kanevsky |
| 6,061,472 | A | 5/2000 | Hullender et al. |
| 6,256,410 | B1 | 7/2001 | Nathan et al. |
| 6,304,674 | B1 | 10/2001 | Cass et al. |
| 6,320,985 | B1 | 11/2001 | Perrone et al. |
| 6,393,395 | B1 | 5/2002 | Guha et al. |
| 6,430,551 | B1 | 8/2002 | Thelen et al. |
| 2002/0067852 | A1 | 6/2002 | Nathan et al. |
| 2004/0037463 | A1 | 2/2004 | Calhoun et al. |
| 2004/0213455 | A1 | 10/2004 | Lossev et al. |
| 2004/0234128 | A1 | 11/2004 | Thiesson et al. |

FOREIGN PATENT DOCUMENTS

CA    2463236    4/2003

OTHER PUBLICATIONS

John A. Drakopoulos, Ahmad Abdulkader: Training neural networks with heterogeneous data. Neural Networks 18(5-6): 595-601 (2005).*
IJCNN 2005 call for paper.*
Lionel Prevost, and Maurice Milgram: Modelizing character allographs in omni-scriptor frame: a new non-supervised clustering algorithm Pattern Recognition Letters vol. 21, Issue 4, Apr. 2000, pp. 295-302 doi:10.1016/S0167-8655(99)00159-2.*

(Continued)

*Primary Examiner*—David R Vincent
*Assistant Examiner*—Lut Wong
(74) *Attorney, Agent, or Firm*—Shook Hardy & Bacon L.L.P.

(57) ABSTRACT

Systems and methods are provided for training neural networks and other systems with heterogeneous data. Heterogeneous data are partitioned into a number of data categories. A user or system may then assign an importance indication to each category as well as an order value which would affect training times and their distribution (higher order favoring larger categories and longer training times). Using those as input parameters, the ordered training generates a distribution of training iterations (across data categories) and a single training data stream so that the distribution of data samples in the stream is identical to the distribution of training iterations. Finally, the data steam is used to train a recognition system (e.g., an electronic ink recognition system).

17 Claims, 4 Drawing Sheets

OTHER PUBLICATIONS

Pavel Berkhin "Survey of Clustering Data Mining Techniques" 2002.*

Vuokko Ruori, et al., "Speeding Up On-Line Recognition Of Handwritten Characters By Pruning The Prototype Set," Helsinki University of Technology, Laboratory of Computer and Information Science (5 pages).

Toni M. Rath, et al., "Word Image Matching Using Dynamic Time Warping," Multi-Media Indexing and Retrieval Group, Center for Intelligent Information Retrieval, University of Massachusetts (7 pages).

"Transcriber Handwriting Recognition Application OS Design Development".

Vuokko Ruori, et al., "Speeding Up On-Line Recognition Of Handwritten Characters By Pruning The Prototype Set," Helsinki University of Technology, Laboratory of Computer and Information Science (5 pages) 2001.

Toni M. Rath, et al., "Word Image Matching Using Dynamic Time Warping," Multi-Media Indexing and Retrieval Group, Center for Intelligent Information Retrieval, University of Massachusetts (7 pages) 2003.

"Transcriber Handwriting Recognition Application OS Design Development" Jul. 22, 2005.

* cited by examiner

TRAINING WITH HETEROGENEOUS DATA

BACKGROUND

Computers accept human user input in various ways. One of the most common input devices is the keyboard. Additional types of input mechanisms include mice and other pointing devices. Although useful for many purposes, keyboards and mice (as well as other pointing devices) sometimes lack flexibility. For example, many persons find it easier to write, take notes, etc. with a pen and paper instead of a keyboard. Mice and other types of pointing devices do not generally provide a true substitute for pen and paper. This is especially true for cursive writing or when utilizing complex languages, such as for example, East Asian languages. As used herein, "East Asian" includes, but is not limited to, written languages such Japanese, Chinese and Korean. Written forms of these languages contain thousands of characters, and specialized keyboards for these languages can be cumbersome and require specialized training to properly use.

Electronic tablets or other types of electronic writing devices offer an attractive alternative to keyboards and mice. These devices typically include a stylus with which a user can write upon a display screen in a manner similar to using a pen and paper. A digitizer nested within the display converts movement of the stylus across the display into an "electronic ink" representation of the user's writing. The electronic ink is stored as coordinate values for a collection of points along the line(s) drawn by the user. Software may then be used to analyze the electronic ink to recognize characters, and then convert the electronic ink to Unicode, ASCII or other code values for what the user has written.

It would be highly advantageous to employ a training module to allow computing devices, such as Tablet PCs, to recognize a user's handwriting more accurately. Given the highly variable nature of handwriting and the problems identified above, recognition training is often tedious and inefficient and generally not effective. For example, handwriting samples from the same individual may be of varying types, sizes and distributions. Regarding varying types of samples, one or more sample may comprise a collection of dictionary words, phrases or sentences, telephone numbers, dates, times, people names, geographical names, web and e-mail addresses, postal addresses, numbers, formulas, single character data, or a combination thereof.

SUMMARY

Methods and systems are provided to formalize and quantify neural network training with heterogeneous data. In one embodiment, an example method according to the invention may include an optional step of pruning bad data. In another embodiment, an example method according to the invention may initially partition the data into a number of categories that share some common properties. The partitioned data may be assigned training times for those categories based on an ordered training model. The data categories may then be combined in a training module using a single training data stream that has a recommended distribution.

BRIEF DESCRIPTION OF THE DRAWINGS

These and other advantages will become apparent from the following detailed description when taken in conjunction with the drawings. A more complete understanding of the present invention and at least some advantages thereof may be acquired by referring to the following description in consideration of the accompanying drawings, in which like reference numbers indicate like features, and wherein.

DETAILED DESCRIPTION

I. Example Operating Environment

Figure 1:
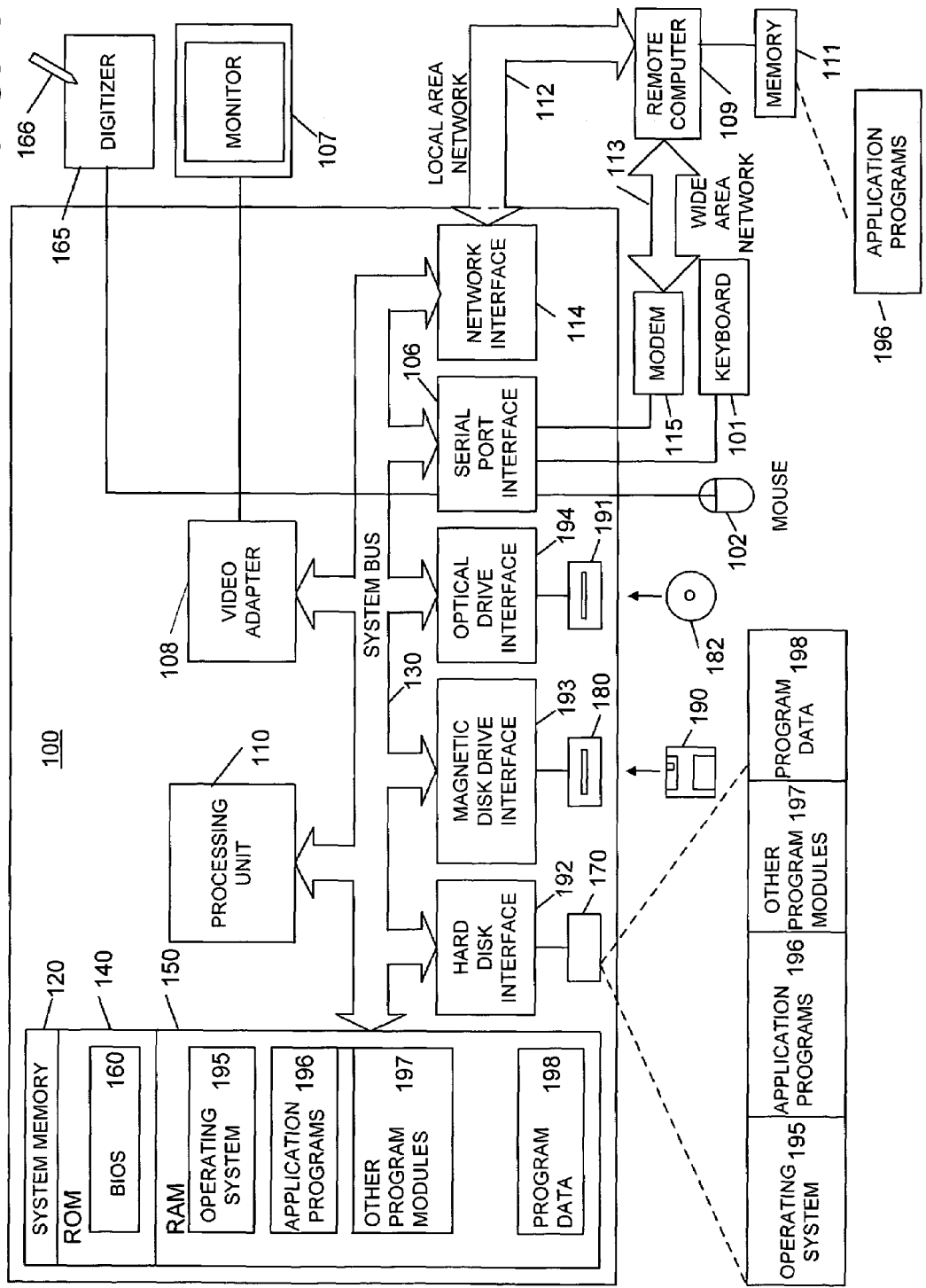
FIG. 1 illustrates an example computer system in which embodiments of the invention may be implemented.

FIG. 1 illustrates a functional block diagram of an example conventional general-purpose digital computing environment that can be used to implement various aspects of the invention. The invention may also be implemented in other versions of computer 100, for example without limitation, a hand-held computing device or a tablet-and-stylus computer. The invention may also be implemented in connection with a multiprocessor system, a microprocessor-based or programmable consumer electronic device, a network PC, a minicomputer, a mainframe computer, hand-held devices, and the like. Hand-held devices available today include Pocket-PC devices manufactured by Compaq, Hewlett-Packard, Casio, and others.

Computer 100 includes a processing unit 110, a system memory 120, and a system bus 130 that couples various system components including the system memory to the processing unit 110. The system bus 130 may be any of various types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM, DVD or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for computer 100. Other types of computer readable media may also be used.

A number of program modules can be stored on the hard disk drive 170, magnetic disk 190, optical disk 182, ROM 140 or RAM 150, including an operating system 195, one or more application programs 196, other program modules 197, and program data 198. A user can enter commands and information into the computer 100 through input devices such as a keyboard 101 and/or a pointing device 102. These and other input devices are often connected to the processing unit 110 through a serial port interface 106 that is coupled to the system bus, but may be connected by other interfaces, such as a parallel port, game port, a universal serial bus (USB) or a BLUETOOTH interface. Further still, these devices may be coupled directly to the system bus 130 via an appropriate interface (not shown). A monitor 107 or other type of display device is also connected to the system bus 130 via an interface, such as a video adapter 108.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Figure 2:
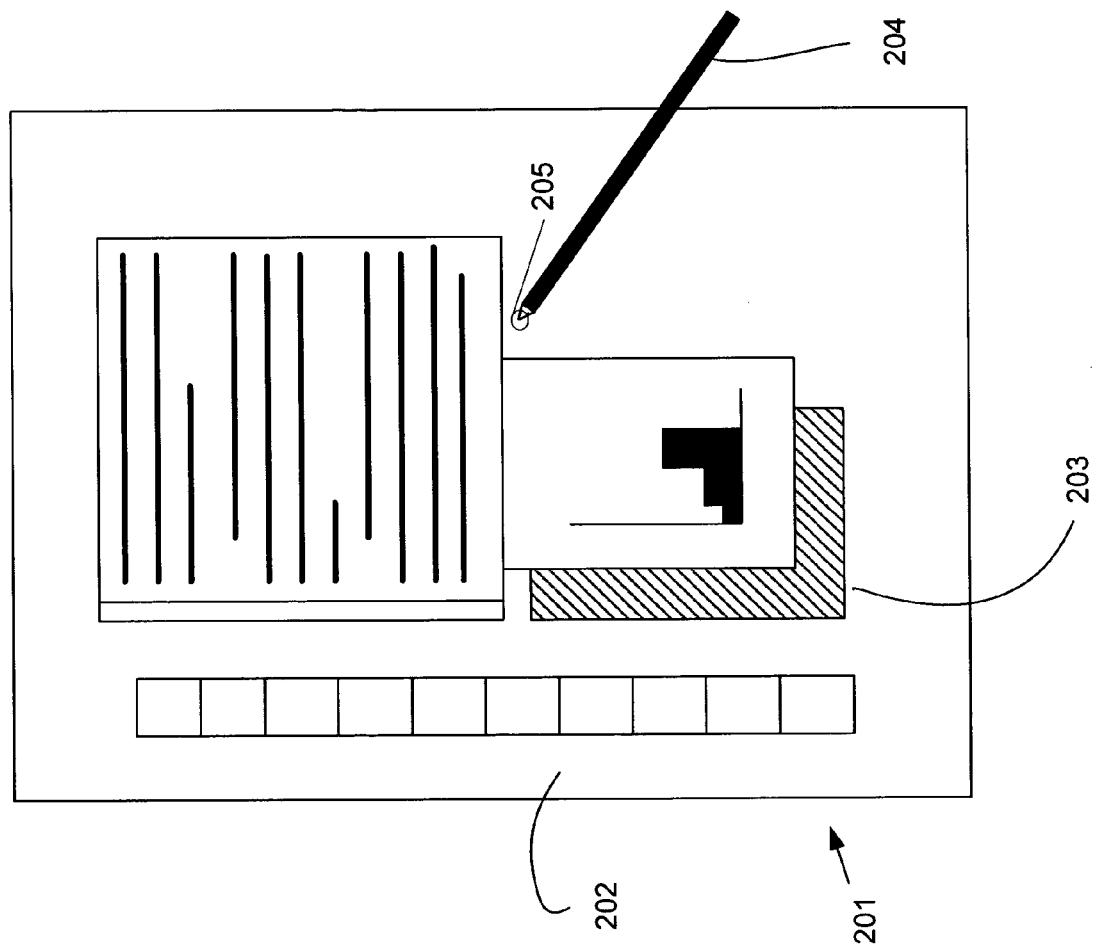
FIG. 2 illustrates an example of a hand-held device or tablet-and-stylus computer that can be used in accordance with various aspects of the invention.

FIG. 2 illustrates an example of a hand-held device or tablet-and-stylus computer 201 that can be used in accordance with various aspects of the invention. Any or all of the features, subsystems, and functions in the system of FIG. 2 can be included in the computer of FIG. 3. Hand-held device or tablet-and-stylus computer 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Hand-held device or tablet-and-stylus computer 201 interprets gestures made using stylus 204 in order to manipulate data, enter text, create drawings, and/or execute conventional computer application tasks such as spreadsheets, word processing programs, and the like. For example, a window 203 allows a user to create electronic ink using stylus 204.

The stylus 204 may be equipped with one or more buttons or other features to augment its selection capabilities. In one embodiment, the stylus 204 could be implemented as a "pencil" or "pen," in which one end constitutes a writing portion and the other end constitutes an "eraser" end, and which, when moved across the display, indicates portions of the display are to be erased. Other types of input devices, such as a mouse, trackball, or the like could be used. Additionally, a user's finger could be the stylus 204 and used for selecting or indicating portions of the displayed image on a touch-sensitive or proximity-sensitive display. Region 205 shows a feedback region or contact region permitting the user to determine where the stylus 204 has contacted the display surface 202.

II. General Description of Aspects of the Invention

One aspect of this invention relates to computer implemented methods of formalizing neural network training with heterogeneous data. Methods in accordance with at least some examples of this invention may include the steps of: (a) partitioning the heterogeneous data into a plurality of data groups; (b) receiving an indication of the relative importance of each data group and an order exponent of training; and (c) creating a training data stream where the distribution of data samples is identical to the distribution of assigned training iterations as specified by the ordered training model—the latter depending on the order of training and the relative importance of each category. Additionally, methods according to at least some examples of this invention further may include the step of pruning the heterogeneous data to remove invalid data and/or training a training module with the training data stream. Still additional example methods in accordance with at least some examples of this invention may include receiving a training time value, wherein a size of the training data stream may correspond to the training time value. In at least some examples of this invention, the training data stream may include electronic ink data and the training module may convert the electronic ink to a computer recognizable character code, such as ASCII characters.

Creation of the training data stream may include various steps or features in accordance with examples of this invention. As more specific examples, creation of the training data stream may include replicating elements in at least one data group and/or removing elements from at least one data group. Additionally, the partitioning step may include various steps or features in accordance with examples of this invention, such as consolidating at least two compatible data groups into a common data group (e.g., data groups may be considered compatible when the data groups result in similar training error rates).

Additional aspects of this invention relate to systems for creating a data file that may be used to train a computer implemented data recognition module. Such systems may include: (a) a partitioning module that partitions heterogeneous data into a plurality of data groups; and (b) an ordering module coupled to the partitioning module, wherein the ordering module receives an indication of the relative importance of each data group and the order of training and creates a training file, wherein the number of elements of each data group corresponds to the relative importance. Such systems further may include: a pruning module coupled to the partitioning module that discards data that fails to meet at least one predefined characteristic and/or a training module that receives the training file and trains a data recognition system (e.g., a system for recognizing electronic ink input data).

Still additional aspects of this invention relate to computer-readable media containing computer-executable instructions for performing the various methods and operating the various systems described above. Such computer-readable media may include computer-executable instructions causing a computer device to perform various steps including: (a) receiving heterogeneous data used to train a data recognition system; (b) partitioning the heterogeneous data into a plurality of data groups; (c) associating an indication of the relative importance of each data group with each data group and an order exponent with a training session; and (d) creating a training data stream where the distribution of data samples is identical to the distribution of assigned training iterations as specified by the ordered training model—the latter depending on the order of training and the relative importance of each category. In accordance with at least some examples of this invention, the associating step may include removing elements from at least one data group and/or replicating elements in at least one data group.

Given this general background and information relating to aspects of this invention, more detailed and specific examples of the invention are described in more detail below. Those skilled in the art will understand, of course, that these more detailed and specific examples are presented to illustrate examples of various features and aspects of the invention. This more detailed and specific description of examples of the invention should not be construed as limiting the invention.

III. Description of Specific Examples of the Invention

Figure 3:
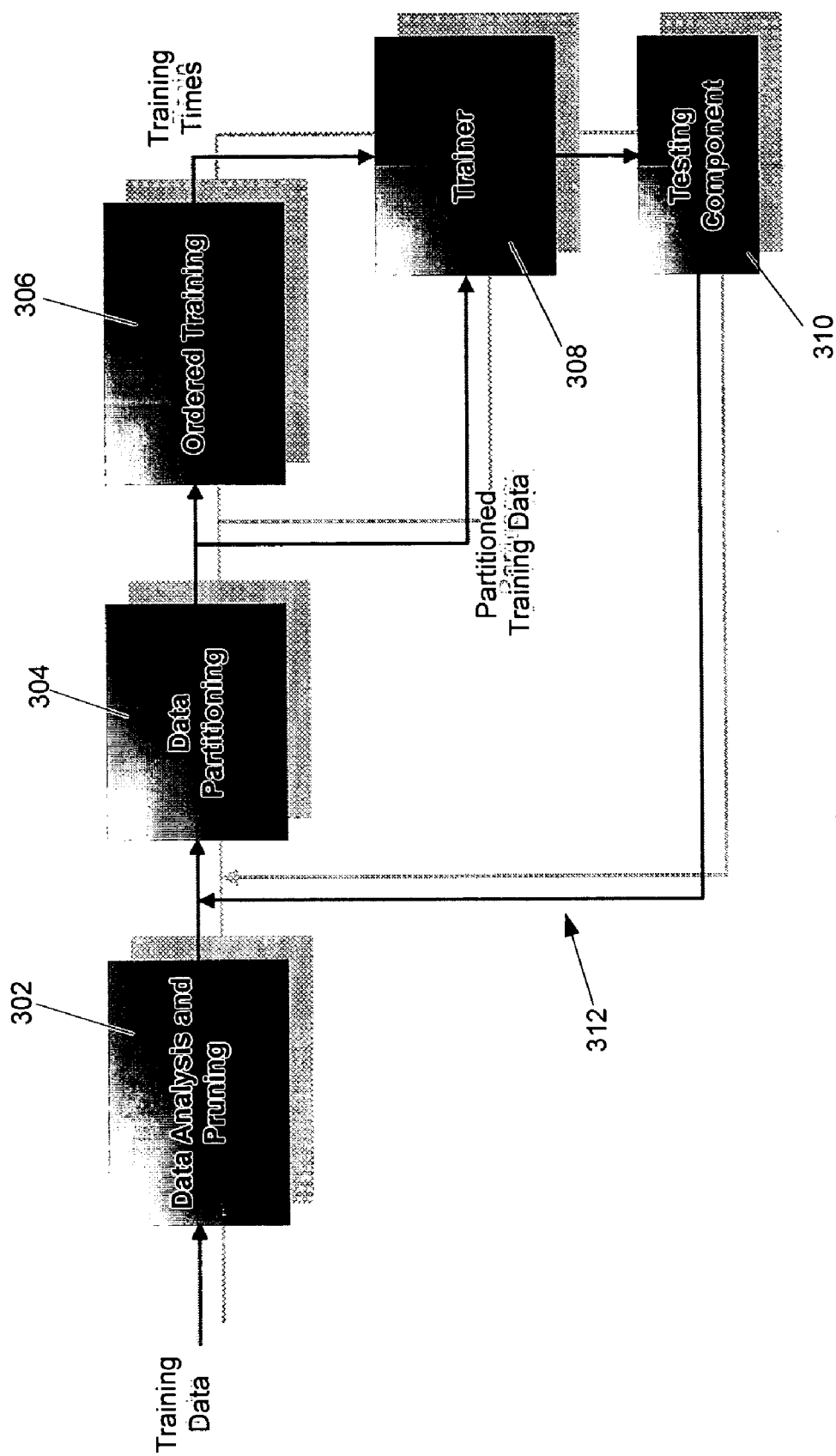
FIG. 3 is an illustrative method of creating a training module to recognize heterogeneous data.

FIG. 3 is a flow diagram of an illustrative method of creating a training module for a handwriting recognition system that uses heterogeneous data for training, in accordance with an example of this invention. As shown in the figure, the method may initiate with optional step 302 to perform a preliminary data analysis and "pruning". As used herein, "pruning" may include any procedure comprising a mechanism to discard, ignore or repair data or files having a select amount or percentage of "bad" data. Data may be determined to be "bad" based upon predefined characteristics, such as for example, straight lines, misspellings, the size, too much or too little density, location within the document, random curves or drawings, and/or insufficient contrast between the handwriting and the background. Moreover, characteristics used to classify data as "bad data" or "good data" may be dependent on the type of data being imported. For example, mathematical formulas have symbols and other formatting characteristics that may be present in one type of imported data that is not present in other imported data. Moreover, the symbols may be larger than the surrounding handwriting. For example, a mathematical formula may include a "sigma" that is larger than the other symbols and letters in the formula and is not centered on the same line. In yet another data set, a portion of the imported data may comprise text of differing languages. In such data sets, the criteria for "bad data" may be different than data sets comprising email, word processing text, numbers, etc.

In one embodiment, step 302 may be fully automated. For example, criteria utilized for data pruning may be based solely, or in part, on the file extension or software associated with the data set. For example, in one embodiment, files having the extension ".doc" are pruned according to one criterion, wherein data files having the extension ".vsd" are pruned according to different criteria. Of course, data files may be pruned according to two or more criteria sources without departing from the invention. For example, files having the extension ".ppt" may first be pruned according to a unique criterion, then pruned according to the same criteria utilized for data sets having the ".doc" extension.

In yet another embodiment, a user may optimize step 302 by selecting, adjusting, removing, or otherwise altering the criteria used to prune a particular data set. For example, in one embodiment, a graphical interface may be provided to the user that allows the user to select or unselect certain criterion elements to apply to the data. In still yet another embodiment, a user interface may be provided to allow a user to manually prune the data. For example, the data may be displayed for the user to manually select one or more items not to process. In yet another embodiment, the user may choose to remove the entire data set from processing. Yet in other embodiments, both automated and manual pruning may be utilized. In one such embodiment, data sets that do not pass at least one automated test may undergo manual testing. Thus, in at least one embodiment, the method may be implemented to allow the computing device to act as a filter in order to reduce the manual effort.

In at least one embodiment, the handwriting sample is preserved in an ink file. In one such embodiment, a separate ink file consists of a sequence of panels, each containing a portion of the handwriting, such as for example, a sentence that is composed of sequence of words (the term "words," as used in this context, should be understood and construed broadly so as to include any character, drawing, writing, ink stroke or set of strokes, or the like). The user may then select individual panels to remove from the data set. An embodiment having an ink file may exist independent of step 302.

Step 304 defines an initial data partitioning step. Such a partitioning, which is required by the subsequent ordered training component (step 306) in this example system and method, could be similar to the data categorization of step 302, but it is otherwise independent of it. One goal is to maximize overall accuracy, and there is no constraint whatsoever on the partitioning itself. In one embodiment, content may define the initial partitioning of the data. For example, the data may be split into groupings including, for example, natural text, e-mail addresses, people names, telephone numbers, formulas, etc. In another embodiment, the source of the data may determine the initial partitioning. For example, data generated by word processing software, such as for example Microsoft® Word®, could be separate and separately grouped from data generated by a spreadsheet application, such as for example, Microsoft® Excel®. Yet in other embodiments, step 304 may employ a combination of various criteria, including but not limited to content or source of the data, language of the document, types of characters within the documents (e.g., mathematical equations, e-mail addresses, natural text, phone numbers, etc.), and the date the data were created. Step 304 also may be used to generate subsequent data partitioning as recommended by the ordered training component 306.

Such a multitude of types and subsequently distinct and differing statistical properties of data sets can create problems during training. The frequency and distribution of various characters (and character combinations) may change significantly across categories. For example, the single slash character "/" may be used more frequently in dates, such as "6/11/05", whereas the sequence "//" may be more prevalent in data sets having URL addresses, such as http://www.microsoft.com. In contrast, the character "I" may appear more frequently in natural text, for example, as used as a personal pronoun. Such differences, if not addressed properly, may compromise recognition accuracy. Indeed, "I" may be misrecognized as "/" and vice versa. Another example may include one or more samples consisting of e-mail addresses, which will invariably have an "@". Therefore, one would desire a training module to properly recognize the "@", however, the user would not want the same training module to automatically convert every "a" to an "@", as this would compromise accurate recognition of many other data sets, such as those containing natural text, etc.

Both the initial and subsequent partitioning may divide the data into a number of categories so that data within each category are treated uniformly while the categories relate in a non-uniform way. Moreover, as one skilled in the art will understand, select methods will not have optional step 302 to prune the data, therefore the initial data partitioning of step 304 may be the first categorization of the data sets in at least some example methods according to this invention.

Figure 4:
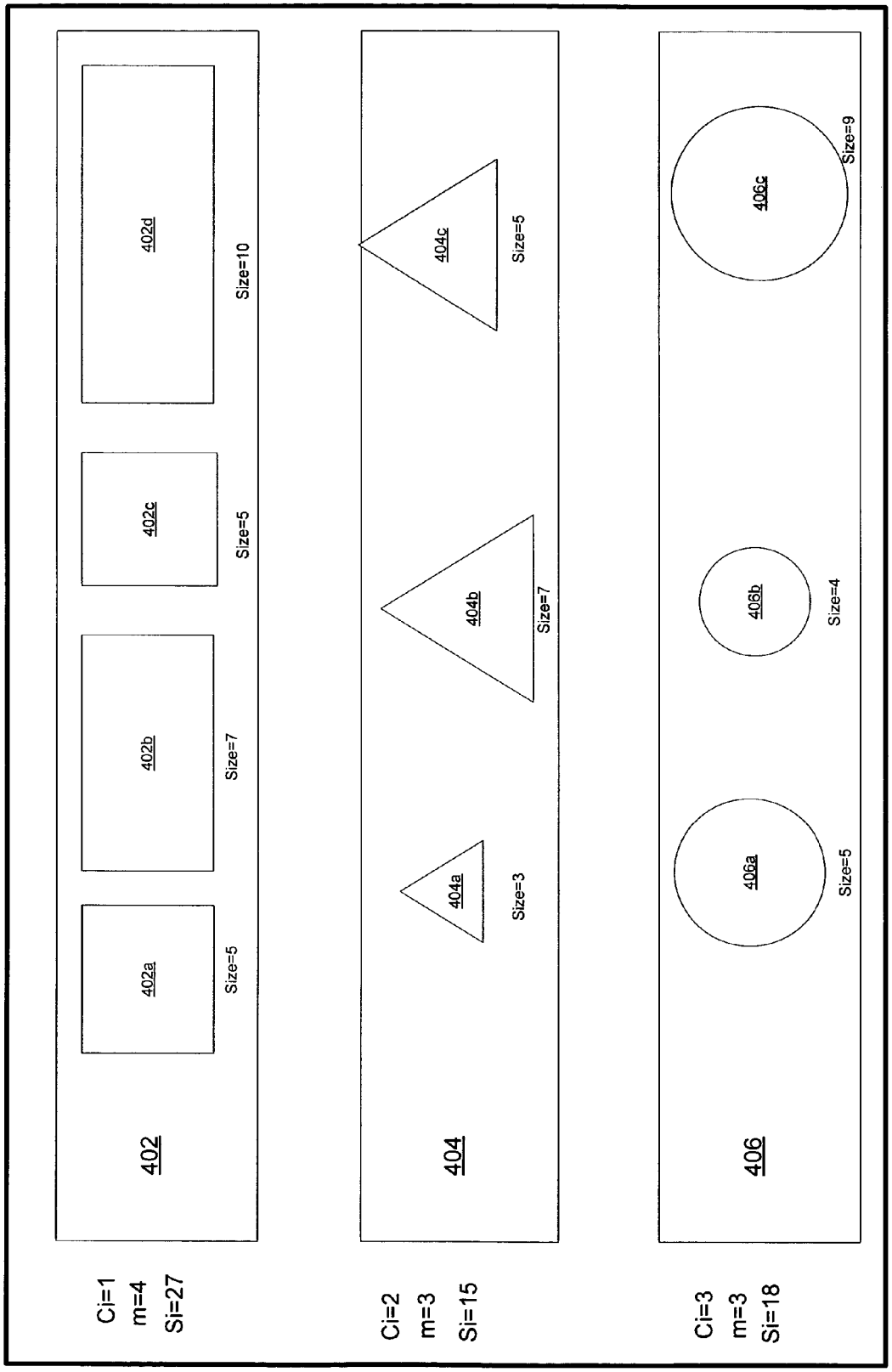
FIG. 4 is an illustrative embodiment of a plurality of data sets or groups partitioned according to one method of the invention.

Data sets may be partitioned according to a variety of algorithms. Algorithms may be used to determine optimal partitions by analyzing the effects of combining and separating data sets. For example, two data sets may be combined when the combination, which would alter the training time assignments, would improve overall accuracy. Conversely, two data sets may be divided when the division, which would subsequently alter training time assignments, improves accuracy FIG. 4 is an illustrative example of a plurality of data sets or groups partitioned according to one method of the invention. As shown in the figure, there are three data sets or categories represented as $C_1$, $C_2$, and $C_3$ (402, 404, and 406) with $m_1$, $m_2$, and $m_3$ data samples, respectively, in these various data sets or categories. As seen in the illustrated example, partition 402 has four data sets (402a-402d), and so this partition 402 has $m_1$=4. Similarly, partition 404 has $m_2$=3 and partition 406 has $m_3$=3. However, the various different samples may have different sizes and thus have higher processing and learning requirements. For example, both a three-letter word and an e-mail address may be considered single samples, but their sizes in characters, and thus in ink, typically can be quite different. As a result, the number of samples m in a category C cannot necessarily determine the size of the category. Rather, the size of the category should be expressed in fixed units (such as bytes) or units that may not vary significantly across samples, such as for example, ink segments or strokes. The size of each data category then may be considered as the sum of the sizes of its data samples. Looking to the illustrated example in FIG. 4, the size of Category 402 is 27, the size of Category 404 is 15, and the size of Category 406 is 18. Denoting the size of the various categories $C_i$ by its size $S_i$ provides the following data for this illustrated example: $S_1=27$, $S_2=15$, and $S_3=18$.

Next, an example of the ordered training step and module will be explained. Various assumptions were used to arrive at the methods used in this example system and method. First, it was assumed that a training data set has a size S, where S is expressed in fixed units (e.g., bytes) or units that do not vary significantly (e.g., ink segments or strokes, etc.), as described above. Furthermore, it was assumed that the data set contains m samples and that training will take a time T (which corresponds to E epochs, or N iterations, one sample used per iteration). Using these assumptions, the number of epochs may be calculated as follows:

$$E=N/m.$$

If the training (or data processing) speed u is defined to be the amount of data processed in a time unit (i.e., $u=SE/T$), then the following relationships also may be determined or derived:

$$N=muT/S \text{ and } E=uT/S.$$

Assuming that S and m are known and that u can be estimated, only a formula for T is needed in order to enable computation of N (the number of iterations) and E (the number of epochs). The ordered training hypothesis specifies that the relationship between training time and data size is polynomial as follows:

$$T=aS^o.$$

As used in the equation for T immediately above, the exponent "o" is the "order exponent" or "order" of training. A low order means that less time is required in order to learn a given problem and thus it implies an easier problem. A high order may imply a more difficult problem or an adverse data distribution. The "importance" of the data is represented by coefficient "a." As described below, different categories of data can have different levels of importance.

Applying the ordered training hypothesis to the formula of the epochs, the following relationship may be derived:

$$E=bS^{o-1},$$

where $b=au$. Thus, b is a coefficient that encodes both processing speed ("u") and the importance of the data ("a").

In the remainder of this specification, the equations will utilize the iteration (N) and epoch (E) terms, and therefore, the second form of the ordered training hypothesis will be used. To simplify subsequent formulas, the volume, volume per sample, and density of a training set will be defined as follows:

$$V=bmS^{o-1} \text{(volume of data)}$$

$$\beta=V/m=bS^{o-1} \text{(volume per sample)}$$

$$d=m/V=(bS^{o-1})^{-1} \text{(density of data)}$$

Intuitively, each sample may be imagined or considered as occupying a unit volume in some imaginary space, and ordered training may be imagined or considered as a process that expands each sample to volume β. At this point, the expansion is a scaling operation. However, in the multi-category case, the scaling would be different for each category resulting in a non-linear transformation of the data.

Using the above definitions, the formulas for time, iterations and epochs may be rewritten as follows:

$$T=\beta S/u$$

$$N=V$$

$$E=\beta$$

From the above description, it is now clear that higher volume will correspond to more iterations while higher volume per sample (or, equivalently, lower density) will correspond to more epochs.

In order to apply the ordered training hypothesis to a training set that contains heterogeneous data, it is assumed in this example system and method that the data has been partitioned into c categories. For each category i ($i=0, 1, \ldots, c-1$), $S_i$ is defined to be its size, $m_i$ is defined to be its number of samples, $T_i$ is defined to be its allocated training time, $N_i$ is defined to be the corresponding number of training iterations, and $E_i$ is defined to be the corresponding number of training epochs. The coefficient $b_i$, as described above, represents the relative importance and processing speed of category i.

The volume ($V_i$), density ($d_i$), and volume per sample ($\beta_i$) are defined as before for each category separately. Normally, it would be $N_i=V_i$; but if the total number of iterations is constrained to be N, introducing a normalizing constant λ, $$N_i = \lambda V_i$$

$$N = \sum_{i=0}^{c-1} N_i$$

then the value of $N_i$ may be calculated from the following equation:

$$N_i = \frac{V_i}{\sum_j V_j} N = \frac{b_i m_i S_i^{o-1}}{\sum_j b_j m_j S_j^{o-1}} N$$

In other examples of systems and methods in accordance with this invention, if desired, the total number of epochs E and/or the total time T may be fixed.

While the above formulas suggest a few possible methods used to order the data for training, one skilled in the art will realize a large number of derivations and other methods may be incorporated or used in place of those listed above. Indeed, the above formulas are described as illustrative examples and not intended to limit the method of ordered training as contemplated by the inventors.

Ordered training may be used to distribute training times more effectively, to partition the data to increase accuracy, and also to emphasize specific training categories. In one embodiment, a single training data stream combines the data so that the overall distribution of data samples follows the distribution of training iterations as defined by the ordered training model. Using a single data-stream avoids catastrophic interference. In general, ordered training may be used to partition the data and emphasize specific data categories to increase accuracy. It can distribute training times in a flexible manner. Therefore, returning to FIGS. 3 and 4, step 308 can be seen as utilizing the partitioned, and possibly pruned data, in a more efficient and accurate manner. For example, in one embodiment, if the category 404 is more difficult to learn or more frequent or important in applications than category 406, then category 404 may be assigned a higher coefficient and thus gain more training iterations. Consequently, data samples 404a, 404b, and 404c may appear more frequently in the training data stream than data samples 406a, 406b, and 406c. A zero coefficient would assign zero iterations to a category and thus effectively eliminate that category from the training and the training data stream. Furthermore, when the number of training iterations is fixed, higher order can be used to emphasize larger data sets while a small order could be employed to emphasize smaller training sets. When the order is 1, the number of iterations assigned to each category is proportional to the number of samples of the category. As one skilled in the art will appreciate, a myriad of factors could be considered when deciding upon an ordered training schedules (e.g, defining the order and the coefficients given the categories, etc.).

In step 308 a data recognition system may be trained with the ordered stream. The data recognition system may be an electronic ink recognition system, a speech recognition system or any other system that recognizes heterogeneous groups of data. A testing component may perform testing of training in step 310 to test the output of step 308. A variety of conventional testing systems and methods may be used to evaluate how well a trainer has been trained. Moreover, a feedback path 312 may be included to improve accuracy. The testing component can determine categories with high or low error rates and unite or split them so that the ordered training module would emphasize or de-emphasize them accordingly on the next training session. For example, if a testing component determines that a trainer has not been trained satisfactorily for email messages and web-addresses, the partitioning module may unite those two into a single category that would gain more training iterations in the next training session (assuming that the order is greater or equal to 1).

IV. Conclusion

The present invention has been described in terms of various example embodiments. Numerous other embodiments, modifications and variations within the scope and spirit of the appended claims will occur to persons of ordinary skill in the art from a review of this disclosure.

We claim:

1. A computer implemented method of formalizing neural network training with heterogeneous data, the method comprising:
    employing at least one processor to execute computer executable instructions stored on at least one computer readable medium to perform the following acts:
        partitioning the heterogeneous data into a plurality of data groups, the heterogeneous data includes at least one of electronic ink or speech data that is employed to train a data recognition system;
        receiving an indication of relative importance of each data group and an order exponent of training for each group;
        creating a training data stream, wherein a distribution of data samples in the training data stream is a function of the distribution of assigned training iterations as specified by an ordered training model that is employed to transform the heterogeneous data to a computer recognizable character code, wherein the distribution of assigned training iterations is based in part on the order of training and the relative importance of each category; and
        generating a data file to train a data recognition module based in part on the training data stream.

2. The computer implemented method of claim 1, further comprising, pruning the heterogeneous data to remove invalid data.

3. The computer implemented method of claim 1, further comprising, replicating elements in at least one data group to create the training data stream.

4. The computer implemented method of claim 1, further comprising, removing elements from at least one data group to create the training data stream.

5. The computer implemented method of claim 1, further comprising, consolidating at least two compatible data groups into a common data group.

6. The computer implemented method of claim 5, wherein data groups are compatible when the data groups result in similar training error rates.

7. The computer implemented method of claim 1, further comprising, determining categories with high or low error rates and uniting or splitting them respectively so that the categories are appropriately emphasized or de-emphasized by the ordered training model on a next training session.

8. The computer implemented method of claim 7, wherein the partitioning is based in part on at least one of content, source, or language of the heterogeneous data, types of characters within a document associated with the heterogeneous data or the date the heterogeneous data was created.

9. The computer implemented method of claim 1, wherein the computer recognizable character code comprises ASCII.

10. The computer implemented method of claim 1, further comprising, receiving a training time value and wherein a size of the training file corresponds to the training time value.

11. A computer implemented system for creating a data file that may be used to train a computer implemented data recognition module, the system comprising:
    a partitioning module that partitions heterogeneous data into a plurality of data groups, the heterogeneous data includes at least one of electronic ink or speech data that is employed to train a data recognition system;
    an ordering module coupled to the partitioning module, wherein the ordering module receives an indication of a relative importance of each data group and an order exponent of training, and wherein the ordering module creates a training file, wherein a number of elements of each data group corresponds to the relative importance; and
    a training module that transforms the heterogeneous data to a computer recognizable character code;
    wherein a memory operatively coupled to a processor retains the partitioning module and the ordering module.

12. The system of claim 11, further including a pruning module coupled to the partitioning module, wherein the pruning module discards data that does not meet at least one predefined characteristic.

13. The system of claim 11, wherein the training module receives the training file and trains the data recognition system.

14. The system of claim 13, wherein the data recognition system comprises an electronic ink recognition system.

15. A computer-readable storage medium containing computer-executable instructions for causing a computer device to perform acts comprising:
- receiving heterogeneous data that includes at least one of electronic ink or speech data used to train a data recognition system;
- partitioning the heterogeneous data into a plurality of data groups;
- associating an indication of a relative importance of each data group with each data group and an order exponent with a training session;
- creating a training data stream, wherein a distribution of data samples is a function of the distribution of assigned training iterations as specified by an ordered training model that is employed to transform the heterogeneous data to a computer recognizable character code, wherein the distribution of training iterations is dependant on the order of training and the relative importance of each category; and
- creating a data file to train a data recognition module based in part on the training data stream.

16. The computer-readable storage medium of claim 15, further comprising removing elements from at least one data group.

17. The computer-readable storage medium of claim 15, further comprising replicating elements in at least one data group.

* * * * *

UNITED STATES PATENT AND TRADEMARK OFFICE
CERTIFICATE OF CORRECTION

PATENT NO.        : 7,593,908 B2
APPLICATION NO.   : 11/167734
DATED             : September 22, 2009
INVENTOR(S)       : Abdulkader et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Fourteenth Day of December, 2010

David J. Kappos
*Director of the United States Patent and Trademark Office*